(12) United States Patent
Menahem et al.

(10) Patent No.: US 10,963,634 B2
(45) Date of Patent: Mar. 30, 2021

(54) CROSS-PLATFORM CLASSIFICATION OF MACHINE-GENERATED TEXTUAL DATA

(71) Applicant: ServiceNow, Inc., Santa Clara, CA (US)

(72) Inventors: Gabby Menahem, Petach Tikva (IL); Dror Mann, Tel Aviv (IL); Yaron Lehmann, Tel Aviv (IL); Eli Polonsky, Tel Aviv (IL)

(73) Assignee: ServiceNow, Inc., Santa Clara, CA (US)

(*) Notice: Subject to any disclaimer, the term of this patent is extended or adjusted under 35 U.S.C. 154(b) by 79 days.

(21) Appl. No.: 15/228,272

(22) Filed: Aug. 4, 2016

(65) Prior Publication Data
US 2018/0041500 A1    Feb. 8, 2018

(51) Int. Cl.
*G06F 40/18* (2020.01)
*H04L 29/06* (2006.01)
*G06F 40/30* (2020.01)
*G06F 40/284* (2020.01)
*H04L 12/24* (2006.01)
*H04L 29/08* (2006.01)

(52) U.S. Cl.
CPC .......... *G06F 40/18* (2020.01); *G06F 40/284* (2020.01); *G06F 40/30* (2020.01); *H04L 41/0631* (2013.01); *H04L 41/142* (2013.01); *H04L 63/1433* (2013.01); *H04L 63/20* (2013.01); *H04L 69/22* (2013.01); *H04L 67/06* (2013.01)

(58) Field of Classification Search
None
See application file for complete search history.

(56) References Cited

U.S. PATENT DOCUMENTS

| 5,787,234 | A |  | 7/1998 | Molloy |
| 6,092,065 | A | * | 7/2000 | Floratos ............... G06K 9/6218 707/737 |
| 6,367,034 | B1 | * | 4/2002 | Novik ............... G06F 17/30516 707/999.003 |
| 6,609,122 | B1 |  | 8/2003 | Ensor |
| 7,020,706 | B2 |  | 3/2006 | Cates |
| 7,028,301 | B2 |  | 4/2006 | Ding |
| 7,062,683 | B2 |  | 6/2006 | Warpenburg |
| 7,076,543 | B1 | * | 7/2006 | Kirti ..................... H04L 41/142 709/223 |

(Continued)

OTHER PUBLICATIONS

No stated author; Symantec™ Control Compliance Suite 11.0 User Guide; 2012; Retrieved from the Internet <URL: https://www.scribd.com/document/126556709/CCS-User-Guide>; pp. 1-952, as printed. (Year: 2012).*

(Continued)

*Primary Examiner* — Saleh Najjar
*Assistant Examiner* — Michael W Chao
(74) *Attorney, Agent, or Firm* — Fletcher Yoder PC

(57) ABSTRACT

A system and method for classifying machine-generated textual data into statistical metrics are determined. The system comprises receiving machine-generated textual data from at least one data source; grouping the machine-generated textual data into a plurality of events; processing each event to determine a plurality of elements embedded therein; determining a type of each of the plurality of elements; and determining a statistical metric for each element based on at least on the type of the element.

21 Claims, 6 Drawing Sheets

(56) References Cited

U.S. PATENT DOCUMENTS

| | | | |
|---|---|---|---|
| 7,131,037 | B1 | 10/2006 | LeFaive |
| 7,170,864 | B2 | 1/2007 | Matharu |
| 7,350,209 | B2 | 3/2008 | Shum |
| 7,610,512 | B2 | 10/2009 | Gerber |
| 7,617,073 | B2 | 11/2009 | Trinon |
| 7,689,628 | B2 | 3/2010 | Garg |
| 7,716,353 | B2 | 5/2010 | Golovinsky |
| 7,769,718 | B2 | 8/2010 | Murley |
| 7,783,744 | B2 | 8/2010 | Garg |
| 7,890,209 | B2 | 2/2011 | Gerber |
| 7,925,981 | B2 | 4/2011 | Pourheidari |
| 7,930,396 | B2 | 4/2011 | Trinon |
| 7,945,860 | B2 | 5/2011 | Vambenepe |
| 7,966,398 | B2 | 6/2011 | Wiles |
| 8,051,164 | B2 | 11/2011 | Peuter |
| 8,224,683 | B2 | 7/2012 | Manos |
| 8,266,096 | B2 | 9/2012 | Navarrete |
| 8,402,127 | B2 | 3/2013 | Solin |
| 8,447,722 | B1* | 5/2013 | Ahuja ............... G06F 17/30592 707/607 |
| 8,457,928 | B2 | 6/2013 | Dang |
| 8,478,569 | B2 | 7/2013 | Scarpelli |
| 8,612,408 | B2 | 12/2013 | Trinon |
| 8,674,992 | B2 | 3/2014 | Poston |
| 8,689,241 | B2 | 4/2014 | Naik |
| 8,743,121 | B2 | 6/2014 | De Peuter |
| 8,832,652 | B2 | 9/2014 | Mueller |
| 8,887,133 | B2 | 11/2014 | Behnia |
| 9,037,896 | B2 | 5/2015 | Addepalli et al. |
| 9,043,332 | B2* | 5/2015 | Noel ....................... G06F 9/542 707/741 |
| 9,065,783 | B2 | 6/2015 | Ding |
| 9,098,322 | B2 | 8/2015 | Apte |
| 9,122,552 | B2 | 9/2015 | Whitney |
| 9,239,857 | B2 | 1/2016 | Trinon |
| 9,294,631 | B1 | 3/2016 | Cogan et al. |
| 9,317,327 | B2 | 4/2016 | Apte |
| 9,363,252 | B2 | 6/2016 | Mueller |
| 9,535,737 | B2 | 1/2017 | Joy |
| 9,557,969 | B2 | 1/2017 | Sharma |
| 9,645,833 | B2 | 5/2017 | Mueller |
| 9,654,473 | B2 | 5/2017 | Miller |
| 9,766,935 | B2 | 9/2017 | Kelkar |
| 9,792,387 | B2 | 10/2017 | George |
| 9,805,322 | B2 | 10/2017 | Kelkar |
| 9,972,103 | B2* | 5/2018 | de Castro Alves ... G06T 11/206 |
| 9,992,220 | B2* | 6/2018 | Coates ................. H04L 63/1416 |
| 9,996,409 | B2* | 6/2018 | Chen ...................... G06F 11/079 |
| 10,003,605 | B2* | 6/2018 | Muddu ................. G06F 16/254 |
| 10,007,717 | B2* | 6/2018 | Zhang ............... G06F 17/30705 |
| 10,015,185 | B1* | 7/2018 | Kolman ............... H04L 63/1433 |
| 10,021,127 | B2* | 7/2018 | DiValentin .......... H04L 63/1408 |
| 10,021,138 | B2* | 7/2018 | Gill ......................... G06F 21/55 |
| 10,037,238 | B2 | 7/2018 | Bikumala |
| 10,043,006 | B2* | 8/2018 | Puri .................. G06F 17/30563 |
| 10,050,917 | B2* | 8/2018 | Alperovitch ........... G06F 21/554 |
| 10,051,010 | B2* | 8/2018 | Carver ............... H04L 63/1441 |
| 10,055,477 | B2* | 8/2018 | Nojima .............. G05B 19/4183 |
| 10,057,285 | B2* | 8/2018 | Choudhary ........... G06F 21/552 |
| 10,061,805 | B2* | 8/2018 | Tidwell ............. G06F 17/30477 |
| 10,063,570 | B2* | 8/2018 | Muddu ................ H04L 63/1416 |
| 10,102,054 | B2 | 10/2018 | Wolf et al. |
| 10,169,122 | B2* | 1/2019 | Tee ..................... G06F 11/0709 |
| 10,169,434 | B1* | 1/2019 | Block ................... G06F 16/254 |
| 10,311,067 | B2 | 6/2019 | Chen et al. |
| 10,534,791 | B1* | 1/2020 | Block ................... G06F 16/248 |
| 2003/0004966 | A1 | 1/2003 | Bolle et al. |
| 2003/0088433 | A1* | 5/2003 | Young ................. G06Q 30/0252 705/14.5 |
| 2003/0149586 | A1 | 8/2003 | Chen et al. |
| 2003/0220940 | A1* | 11/2003 | Futoransky ......... H04L 41/0604 |
| 2005/0060295 | A1 | 3/2005 | Gould et al. |
| 2005/0080806 | A1* | 4/2005 | Doganata ........... G06F 11/0709 |
| 2006/0095521 | A1* | 5/2006 | Patinkin ................. H04L 51/12 709/206 |
| 2007/0011134 | A1* | 1/2007 | Langseth .............. G06F 16/254 |
| 2007/0214164 | A1* | 9/2007 | MacLennan ...... G06F 17/30943 |
| 2007/0220063 | A1* | 9/2007 | O'Farrell .............. G06F 17/277 |
| 2007/0244859 | A1* | 10/2007 | Trippe .................. G06F 16/338 |
| 2010/0017487 | A1 | 1/2010 | Patinkin |
| 2010/0057677 | A1 | 3/2010 | Rapp et al. |
| 2010/0125911 | A1* | 5/2010 | Bhaskaran ............. G06Q 10/10 726/23 |
| 2010/0312522 | A1* | 12/2010 | Laberge ............. G05B 23/0227 702/184 |
| 2010/0312769 | A1* | 12/2010 | Bailey ............... G06F 17/30705 707/740 |
| 2011/0099500 | A1* | 4/2011 | Smith ..................... H04L 41/22 715/771 |
| 2012/0062574 | A1 | 3/2012 | Dhoolia et al. |
| 2012/0150859 | A1 | 6/2012 | Hu |
| 2012/0197896 | A1* | 8/2012 | Li ..................... H04L 29/08072 707/740 |
| 2013/0097701 | A1* | 4/2013 | Moyle ................... G06F 21/552 726/22 |
| 2013/0262656 | A1* | 10/2013 | Cao ..................... H04L 41/5009 709/224 |
| 2013/0268839 | A1* | 10/2013 | Lefebvre ................. G06F 17/21 715/234 |
| 2013/0311481 | A1 | 11/2013 | Bhatt et al. |
| 2014/0095425 | A1* | 4/2014 | Sipple ..................... G06N 7/005 706/52 |
| 2014/0129536 | A1 | 5/2014 | Anand et al. |
| 2014/0324862 | A1* | 10/2014 | Bingham ............. G06F 9/45533 707/737 |
| 2015/0019537 | A1* | 1/2015 | Neels ..................... G06F 16/26 707/722 |
| 2015/0029213 | A1* | 1/2015 | Benson ................ G06T 11/206 345/625 |
| 2015/0039651 | A1* | 2/2015 | Kinsely ................ G06F 16/254 707/779 |
| 2015/0149879 | A1* | 5/2015 | Miller ................. G06F 16/2477 715/226 |
| 2015/0213631 | A1* | 7/2015 | Vander Broek ....... G06T 11/206 345/589 |
| 2015/0278823 | A1 | 10/2015 | Kushnir et al. |
| 2015/0363464 | A1* | 12/2015 | Alves ................ G06F 16/24534 707/765 |
| 2015/0370799 | A1* | 12/2015 | Kushmerick .......... H04L 43/028 707/740 |
| 2016/0034525 | A1* | 2/2016 | Neels ..................... G06F 16/285 707/737 |
| 2016/0065594 | A1* | 3/2016 | Srivastava ........... H04L 63/1433 726/23 |
| 2017/0031659 | A1* | 2/2017 | Burke ................... G06F 16/248 |
| 2017/0063896 | A1* | 3/2017 | Muddu ................ H04L 63/1425 |
| 2017/0075744 | A1 | 3/2017 | Deshpande et al. |
| 2017/0272458 | A1* | 9/2017 | Muddu ................ H04L 63/1425 |
| 2018/0115464 | A1 | 4/2018 | Fighel |
| 2018/0146000 | A1* | 5/2018 | Muddu ................ H04L 63/1425 |
| 2018/0157762 | A1* | 6/2018 | Tee ....................... G06K 9/6218 |
| 2018/0159880 | A1* | 6/2018 | Sood ................... H04L 63/1425 |
| 2018/0159885 | A1* | 6/2018 | Baum ............... G06F 17/30619 |
| 2018/0173769 | A1* | 6/2018 | Saperstein .......... H04L 63/1416 |
| 2018/0191754 | A1* | 7/2018 | Higbee ................... H04L 63/20 |
| 2020/0012715 | A1* | 1/2020 | Miller ................... G06F 40/279 |

OTHER PUBLICATIONS

Carasso, David; Exploring Splunk; 2012; Retrieved from the Internet URL https://www.splunk.com/pdfs/exploring-splunk.pdf; pp. 1-156, as printed. (Year: 2012).*

Bitincka et al., Optimizing Data Analysis with a Semi-structured Time Series Database; 2010; Retrieved from the Internet URL https://www.usenix.org/legacy/events/slaml10/tech/full_papers/Bitincka.pdf; pp. 1-9, as printed. (Year: 2010).*

Gerhards; RFC 5424—The Syslog Protocol; 2009; retrieved from the internet https://tools.ietf.org/pdf/rfc5424.pdf; pp. 1-38 as printed. (Year: 2009).*

(56) References Cited

OTHER PUBLICATIONS

Roberts; Stock-Market "Patterns and Financial Analysis: Methodological Suggestions"; 1959; Retrieved from the Internet https://www.jstor.org/stable/2976094; pp. 1-11 as printed. (Year: 1959).*

Humphries et al.; Extensible Log VISualization; 2013; Retrieved from the Internet https://dl.acm.org/doi/abs/10.1145/2517957.2517959; pp. 1-8 as printed. (Year: 2013).*

Symantec: Control Compliance Suite 11.0 User Guide; 2012; pp. 1-952.

\* cited by examiner

CROSS-PLATFORM CLASSIFICATION OF MACHINE-GENERATED TEXTUAL DATA

TECHNICAL FIELD

The present disclosure generally relates to classification and reconstructing of machine-generated data generated by different sources.

BACKGROUND

The amount of data being generated by various machines (e.g., appliances, servers, software tools, etc.) connected in an organization is enormous. The machine-generated data may be in a structured textual formant, an unstructured textual format, or combination thereof. Examples for such machine-generated textual data include logs, metrics, configuration files, messages, spreadsheets, events, alerts, sensory signals, audit records, and so on. The various machines in an enterprises are typically from multiple different vendors, thus even if the data from each vendor is in a structured format, that data is not unified across different vendors. In large, machine-generated textual data is in a natural language that can be read and understood by humans as machines are currently not adapted to recognized such data.

The vast amount of machine-generated textual data requires information technology (IT) personnel to effectively deal with countless unwanted emails, messages, notifications, and the like to identify a specific malfunction. The ability of a person (e.g., an IT administrator) to react to such high volume of data is limited (a person can read so many emails in an hour). Further, the high volume of data decreases productivity and delays detection of critical issues, as not all data can be processed by the person. Moreover, a user that needs to process such large volumes of data may wish to gain visibility as to the performance of the entire IT systems in the enterprises and determine a root-cause for reported malfunction. For example, the machine-generated textual data may include temperature sensor readings indicative on a high-CPU temperature and security logs indicative of new viruses. Currently, IT personnel have no effective way to determine any causality between these reported inputs.

Existing solutions cannot resolve the deficiencies noted above, as such solutions operate in silos. That is, the creation of machine-generated textual data and reading of such data are performed by different solutions (components), which are not necessarily developed by the same vendors. Furthermore, some existing solutions for digital events-ingestion merely aggregate machine-generated data and provide search capabilities across the aggregated data. Other solutions are limited in processing a limited set of textual data generated by common tools. However, such solutions typically do not cover the entire spectrum of machines installed in an organization and are not adapted to cover the entire set of logs, events, etc. generated by the machines. Therefore, meaningful and important information may not be detected or otherwise analyzed by such solutions.

As a result, existing solutions are not designed to perform the tasks of unifying, classifying, and/or ingesting machine-generated due to at least the following challenges: the need to query multiple data-sources storing data in different structures at the same time; that the structure of machine-generated data is not always standardized; that the data is formatted with the intention that the data is to be ingested by a human rather than a computer; that machine-generated data may include a mixture of the original events, wrapped with unrelated additional information (e.g., Syslog headers added by relay servers); and that the same data may be serialized in several manners (e.g. JSON, XML).

As a result of the deficiencies of existing solutions, machine-generated textual data is often analyzed by humans. Of course, any manual analysis is prolonged, requires unnecessary human resources, and affects the overall performance of the enterprise. A major drawback of this approach is that the amount of data that can be processed by users such as IT personnel is limited by restraints on human resources. Due to the size, variety, retention, and dynamic nature of machine-generated data that continues to grow, a manual approach for solving the above-noted tasks is inefficient.

A semi-automatic approach has been introduced where dedicated scripts are designed for parsing and categorizing machine-generated data, building machine-generated data analysis systems, and maintaining machine-generated data warehouse software. This semi-automatic approach requires significant computational resources to ensure that data is properly stored and query-able. Such an approach also mandates continuous maintenance for assessing what data elements exist and how the data elements are classified ahead of time; developing methods for sanitizing, parsing, categorizing, and monitoring the machine-generated data in various formats; and setting up the computing resources to execute such methods.

Another drawback of the existing solutions is that, due to the dynamic nature of machine-generated data, new scripts need to continuously be developed and existing scripts need to be frequently adapted. Further, as the scripts cannot capture all data sources, data from some sources can be handled, while the rest cannot. For example, application logs may be handled through scripts, but the virtualization layer logs will not be processed.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for classifying machine-generated textual data into statistical metrics. The method comprises receiving machine-generated textual data from at least one data source; grouping the machine-generated textual data into a plurality of events; processing each event to determine a plurality of elements embedded therein; determining a type of each of the plurality of elements; and determining a statistical metric for each element based on at least on the type of the element.

Some embodiments disclosed herein include a system for classifying machine-generated textual data into statistical metrics. The system comprises a processing circuit; a memory communicatively connected to the processing circuit, wherein the memory contains instructions that, when executed by the processing circuit, configure the system to: receive machine-generated textual data from at least one data source; group the machine-generated textual data into a plurality of events; process each event to determine a plurality of elements embedded therein; determine a type of each of the plurality of elements; and determine a statistical metric for each element based on at least on the type of the element.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
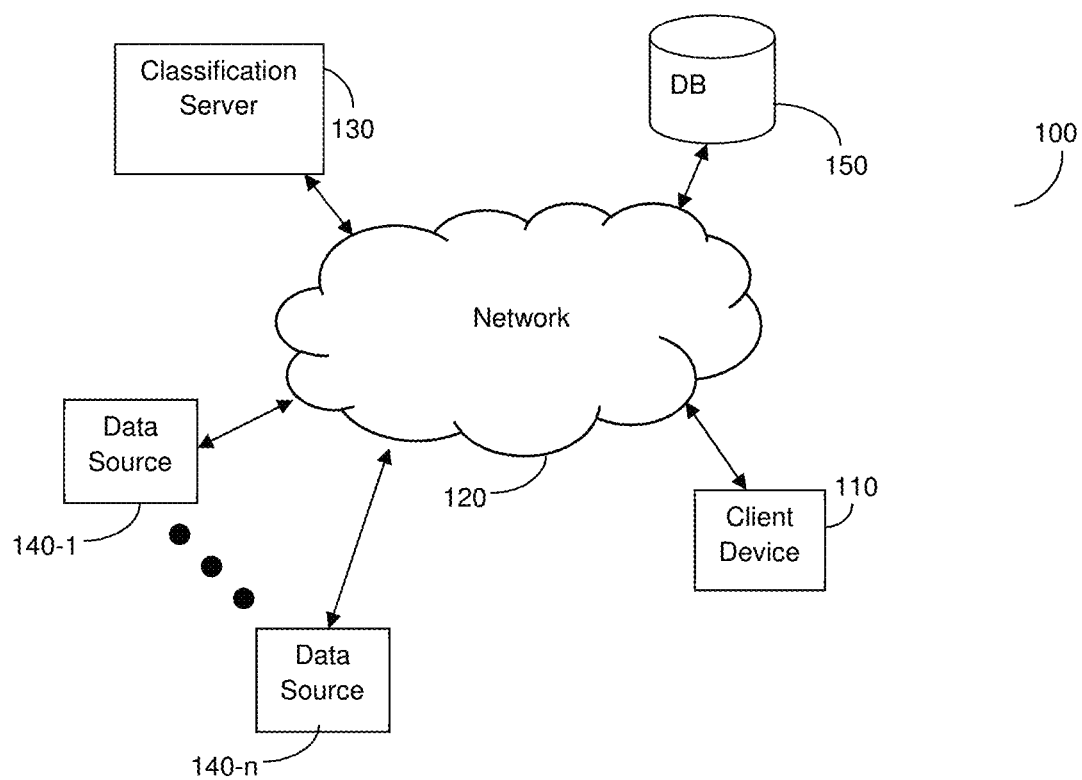
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Some example embodiments disclosed herein provide for classification and reconstructing of machine-generated textual data provided by different sources into different metrics. The classification allows for ingestion, processing, analysis, aggregation, and correlation of machine-generated data by machines (systems) through a fully automated process.

In an embodiment, the machine-generated textual data is collected from one or more data sources. The collected data is divided into individual events. The events are further processed to identify any wrapped information added to these events and saved as metadata while key-value pairs are extracted from original payload data of each event. The various embodiments are now discussed in greater detail.

FIG. 1 shows an example network diagram 100 utilized to describe the various disclosed embodiments. The network diagram 100 includes a client device 110, a network 120, a classification server 130, and a plurality of data sources 140-1 through 140-n (hereinafter referred to individually as a data source 140 and collectively as data source 140, merely for simplicity purposes). In some embodiments, the network diagram 100 further includes a database 150 communicatively connected to the network 120 and utilized to store machine-generated textual data, events processed based on machine-generated textual data, and the classification results.

The client device 110 may be operated by a user (e.g., a system administrator) to control the operation the classification server 130, view classification results, and so on. The network 120 may be, but is not limited to, a local area network (LAN), a wide area network (WAN), the Internet, a wired network, a wireless network, similar networks, and the like, as well as any combination thereof.

Each of the data sources 140 generates machine-generated textual data. The data sources 140 may be different machines, systems, or software tools operable in organization and configured to monitor, control, and report on issues related to, for example, computing infrastructure of an organization. Examples for the data sources 140 include any IT-based device, such as routers, network appliances, application servers, database servers, sensors, and the like. In general, any virtual or physical computing resource adapted to generate textual data can serve as a data source 140.

The machine-generated textual data generated by the data sources 140 may include, for example, application logs, configuration files, messages, spreadsheets, events, alerts, sensory signals, audit records, and so on. It should be noted that the data sources 140 are different from each other and, thus, the data provided by each source may be of a different format, structure, or both. Furthermore, some of the data sources 140 may output structured data while others may output unstructured data. The machine-generated textual data provided by the data sources 140 may be standardized or not-standardized.

The machine-generated textual data may be encapsulated in CSV files, JSON files, XML files, plain text files, and so on. Such files can be pulled by the server 130 (from the sources 140), pushed to the server 130, upload to the server 130, received at the 130 through other methods or channels, or a combination thereof. Typically, JSON and XML files are streamed in real-time while CVS files are uploaded in batches.

According to the disclosed embodiments, the classification server 130 is configured to classify the received machine-generated textual data into a set of metrics. The metric types include, but are not limited to, a histogram, a meter, a gauge, and the like. In addition, the classification server 130 is configured to output metadata associated with each event in the machine-generated textual data and a schema that can be used to structure the event. The schema allows for performance of various operations on events, such as querying, filtering, manipulating, calculating statistical attributes, or otherwise handling the event or parts of the event.

In an embodiment, events are generated by dividing the received machine-generated textual data into a single logical entity of information. As an example, a log line in the received machine-generated textual data is an event. As another example, a sequence of recorded transactions having the same transaction ID is an event.

In an embodiment, the classification server 130 is further configured to process the events to generate or otherwise identify any of, or a combination of, metadata, key-value pair, tokens, clusters, and properties. Such identified pieces of information are classified into one or more metrics and utilized to define an event schema. In an embodiment, the contextual information of such properties are also determined.

Figure 2:
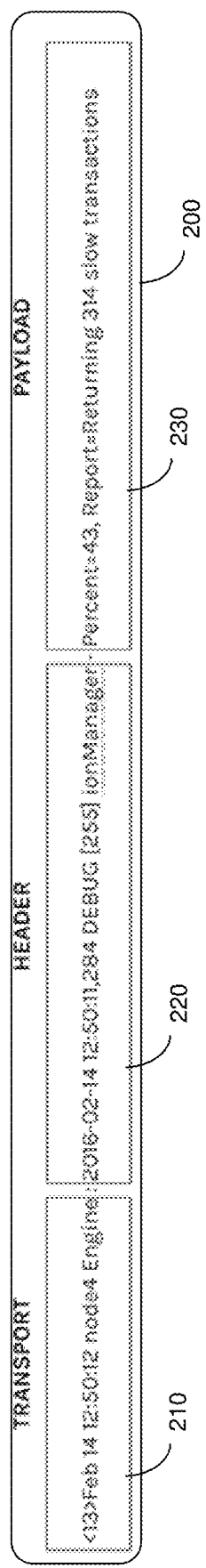
FIG. 2 is a diagram illustrating header and payload portions of an event.

The metadata is generated by un-wrapping any information added during transport and/or serializing of events (embedded in the machine-generated textual data). To this end, the classification server 130 is configured to identify headers of other fields in the events that are associated with known transport protocols, serializing protocols, or combinations of transport and serializing protocols. The example FIG. 2 shows an event 200 which is a log line. The event 200 includes 3 portions: headers 210 and 220, and a payload 230.

The text "<13>Feb 14 12:50:12 node4 Engine:" of the header 210 is text of a Syslog® standard transport header and the text "2016-02-14 12:50:11,284 DEBUG [255] ionManager" of the header 220 is the application-logger's header text. These two snippets of texts are added to the metadata of the event 200. The metadata may be saved in the database 150.

The payload 230 of the event is analyzed to identify key-value pair, properties, and tokens. In the above example, the payload portion is:

"Percent=43, Report=Returning 314 slow transactions"

Key-value pairs are identified using a set of regular expressions designed to identity characters (symbols and/or letters) indicative of values, e.g., "=", "=>" or words "equal to"; "bigger than", and so on. For example, the regular expressions can identify expressions, such as "a"="b", a->"b", 'a'=>b, and so on.

In the above example payload 230, the key-value pair are "Percent=43" and "Report=Returning 314 slow transactions". The key-value pair are extracted and categorized into different categories including, for example, a pair, a key name, and a value. In the above example, the key-value pair "Percent=43", the key name is "Percent" and the value is "43". For the key-value pair "Report=Returning 314 slow transactions", the key name is "Report" and the value is "Returning 314 slow transactions". The extracted Key-value pairs, and the values of the categories are saved in the database 150.

Figure 3:
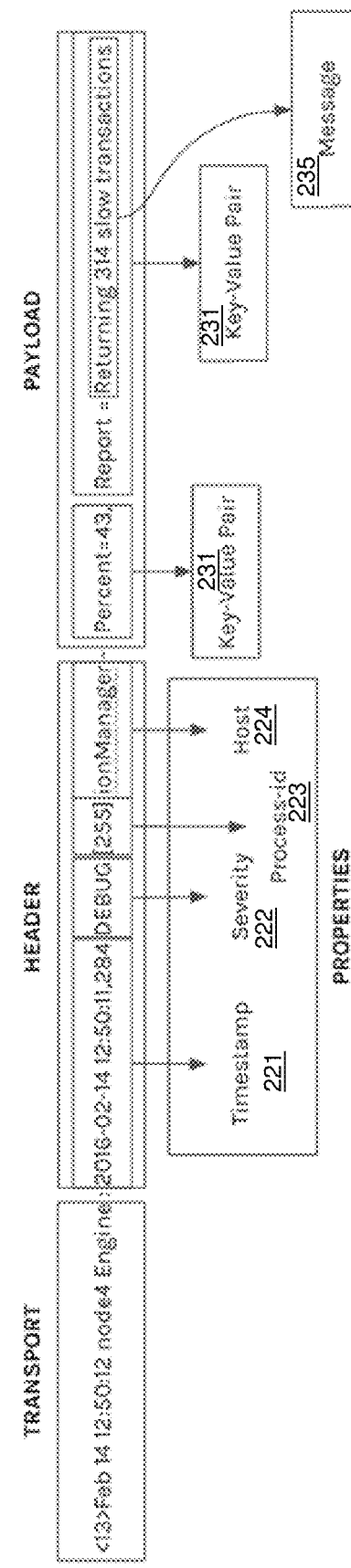
FIG. 3 is a diagram illustrating the identification of properties, key-value pairs, tokens and messages for the event shown in FIG. 2 according to an embodiment.

The classification server 130 is further configured to process the various portions of an event to identify properties of the event. The properties include, but are not limited to, a timestamp, a string representing severity, a network address (e.g., an IP address, a URL, a host name, etc.), and the like. The properties are identified, for example, by parsing the contents of the events and matching against a predefined pattern, such as a date format (e.g., MM-DD-YYYY), a list of key words indicating severity, and so on. As demonstrated in FIG. 3, the header 220 includes the properties of a timestamp 221, a process ID 222, a severity 223, and a host name 224.

The classification server 130 is further configured to process the various portions of an event to identify contextual tokens. Typically, contextual tokens are identified in messages included in the event. A message includes free-text that cannot be categorized as a property and has a length (e.g., number of characters) above a predefined threshold. In the example shown in FIG. 3, the free-text "returning 314 slow transactions" is a message (labeled as 235).

Each message is further processed to at least cluster and tokenize its content. Then, the context of the clusters, the tokens, or a combination of the clusters and the tokens, is determined. To this end, the classification server 130 is configured to parse the message to identify tokens. A token is any word in the message representing a value or any contextual meaning.

In the example message "returning 314 slow transactions", the value "314" is a token and the word "slow" is a contextual token. The clustering is performed on the entire message where certain tokens are masked. The clustering is performed against a set of already created clusters. If a new message cannot be clustered to an existing cluster, a new cluster is created. In an embodiment, each cluster is assigned with a cluster ID. Two or more messages are clustered to the same cluster if they demonstrate a similar pattern or were generated from the same template.

Figure 4:
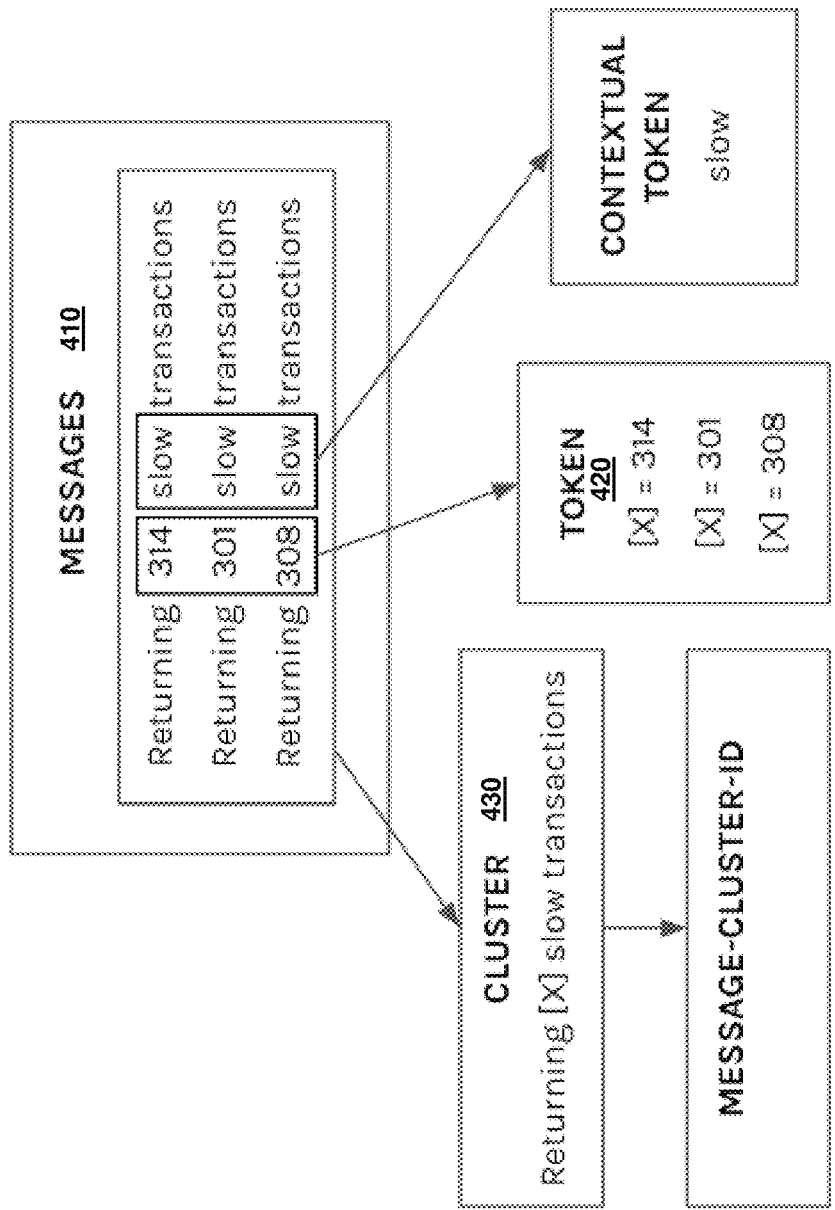
FIG. 4 is a diagram illustrating tokenizing and clustering of messages according to an embodiment.

The clustering operation and the tokenization process are demonstrated in FIG. 4. The input messages 410 all include tokens 420, where each of the tokens 420 represents a counter value. Each of the input messages 410 has the same pattern of: "Returning [X] slow transactions". The counter value (token) is masked for the clustering. All messages 410 are clustered to the same cluster 430. Each cluster is assigned a cluster-ID which is a unique identifier that allows for easier querying and manipulation of the cluster than that of the cluster's original textual form.

The classification server 130 is further configured to determine the context of tokens, and clusters of messages. This is performed, in part, based on contextual analysis of the free-text part of the event. The contextual analysis is configured to identify keywords in the free-text, such as common or known applications' names, sentiment-words (i.e., words having a negative or positive sentiment), and so on. In addition, context may be determined by correlating the message with certain properties identified in headers. For example, the severity property may be indicative of the context of a message.

In the example above, the cluster including messages of "Returning [X] slow transaction" is having negative context, due at least in part to the words "slow" and "returning". The token "slow" is a contextual token.

The classification server 130 is further configured to determine the metric (a statistical value distribution) for each of the clusters, tokens, key-value pairs, and properties. In an embodiment, the determination of which metric type to associate with each such element is based on the element's type, context, or a combination thereof. That is, for each identified element (clusters, tokens, key-value pairs, and properties) it is determined whether the element's value can be statistically measured as any or all of a value distribution (histogram), an appearance rate (meter), or a value range (gauge). In an embodiment, the context of an element can be utilized to determine its statistical value distribution.

In an embodiment, the association of a metric type to elements can be performed using an artificial intelligence process designed to mimic the operation of a person trying to perform such an association. For example, such process would first determine if the values of the elements are numeric, textual, repeated (e.g., many possibilities or a seemingly finite number of possible values are available), fluctuated, and/or monotonic, and so on. Then, based on the characteristics of each element's values, a metric type is associated with that.

In another embodiment, metric classification includes determining which timespans are of interest for each metric. For example, some metrics provide meaningful information in day-over-day time frames and some for shorter periods (e.g., 1 second). Such classification is important to later select a technique processing the classified events in order to detect or forecast failures, generate recommendations, and so on.

As an example, properties such as timestamps or threadIDs are not measured because they do not have meaningful statistical value distributions. An IP address property may be measured as a meter statistical distribution. A key-value pair with variable values may be tracked as histograms statistical distribution. Cluster-IDs may be tracked as a meter statistical distribution to determine their rate of appearance.

Figure 5:
FIG. 5 is a diagram illustrating classification of key-value pair tokens, and cluster into metrics according to an embodiment.

The classification server 130 is further configured to classify elements of similar events (or clustered messages) based on the metrics determined for the respective elements. Referring now to FIG. 5 showing the classification of events' payloads 510 classified into three types of metrics (histogram 520, meter 530, and gauge 540). The key-value pair "Percent=43"; "Percent=67"; etc. are all classified as a histogram metric 420 and gauge 540. The cluster-ID of a cluster having messages in the pattern is "returning [x] slow transactions" is classified as a meter 530. The tokens "[X]=314"; "[X]=301"; etc. are classified as a gauge metric 540.

It should be appreciated that the classification into at least statistical metrics allow for manipulation of the machine-generated textual data via computational processes. The classification further allows for processing so as to render such machine-generated textual data suitable for ingestion in a manner that is intuitive for humans.

In an embodiment, once the metric type is determined, certain statistical attributes can be calculated in advance. For example, for events classified as histogram different percentiles may be calculated as events are gathered and processed. As another embodiment, events classified as a meter-type statistical attributes such as mean, standard deviation, median over different time periods, and so on can be calculated.

It should be understood that the embodiments disclosed herein are not limited to the specific architecture illustrated in FIG. 1, and other architectures may be equally used without departing from the scope of the disclosed embodiments. Specifically, the classification server 130 may reside in a cloud computing platform, a datacenter, and the like. Moreover, in an embodiment, there may be a plurality of classification servers operating as described hereinabove and configured to either have one as a standby, to share the load between them, or to split the functions between them.

Figure 6:
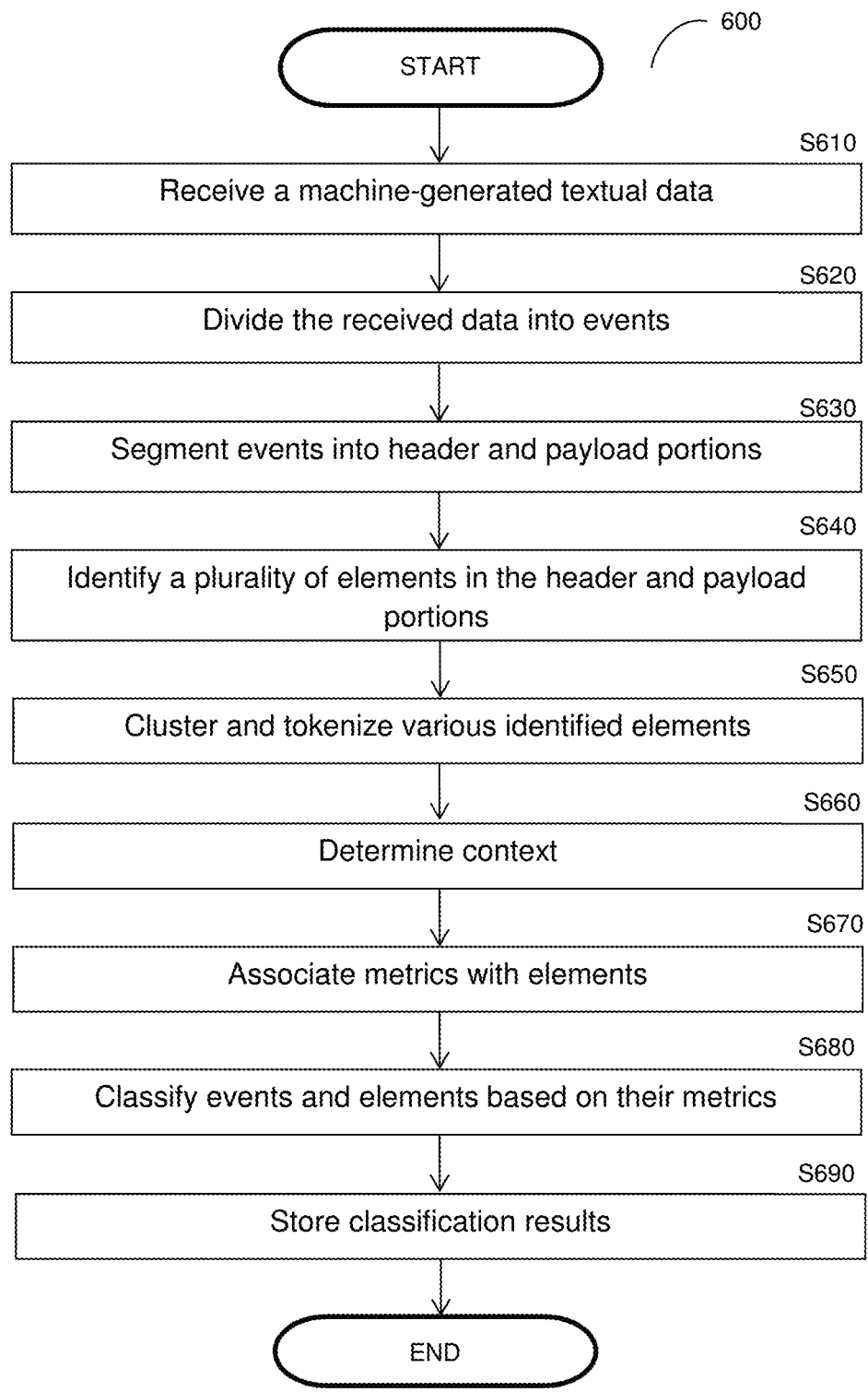
FIG. 6 is a flowchart illustrating a method for classifying machine-generated textual data according to an embodiment.

FIG. 6 shows an example flowchart 600 of a method for classifying machine-generated textual data into statistical metrics according to an embodiment. At S610, machine-generated textual data is received from a plurality of data sources. The machine-generated textual data may include, but is not limited to, application logs, configuration files, messages, spreadsheets, alerts, sensory signals, audit records, combinations thereof, and the like.

At S620, the received data is divided or otherwise grouped into events. An event may be a single logical entity of information.

At S630, each event is segmented into portions including headers and a payload. The headers may have been added during the transport or serialization of the events (e.g., when transporting events between machines, saving events to a repository, and so on).

At S640, a plurality of elements is identified in the header and payload portions. In an embodiment, S640 includes processing headers to identify properties (e.g., timestamps, severity, etc.). In a further embodiment, a payload is analyzed to identify key-value pairs, tokens, messages, or a combination thereof. In an embodiment, S640 may be performed by applying various techniques discussed above, such as recognition of the headers using known protocols' structures, using regular expression to identify key-value pairs, and so on.

At S650, the identified messages are tokenized and clustered. A message includes free-form text in the payload. In an embodiment, tokenizing the message includes parsing the message into words and determining which word has a variable value. Such a word is considered a token. The clustering of a message includes masking any identified token and matching the message against a set of existing clusters. A token matches a cluster if its pattern is similar or the same as the pattern of other messages in the cluster. If no matching cluster is found, a new cluster is created and the message is added or otherwise associated with the newly created cluster. Each cluster is identified by a unique cluster-ID.

At S660, the context of the identified elements is determined. In an embodiment, the context of a message is determined using contextual analysis, correlation of properties, or a combination thereof. The context of a property or a token may be determined based on a predefined dictionary.

At S670, based on the type, the context, or the type and the context of each element, a metric defining a statistical value distribution is associated with each element. A metric may include, for example, gauge, meter, histogram, and the like. Various examples for association of metrics to elements are provided above.

At S680, each event and its respective elements are classified based on their assigned metrics. As demonstrated in FIG. 5, the classification may be performed on tokens, messages' clusters, payloads, key-value pairs, and more.

At S690, the classification results, identified elements, updated or new clusters, events, the machine-generated metadata, or a combination thereof may be saved in a database (e.g., the database 150).

In certain embodiments, the classification results may be verified and, if the results cannot be verified, the classification of the received data is performed. In an example embodiment, the verification can be performed using a machine-learning process in which the results are compared to a trained data model. The quality and the correctness of the classification results can be computed as an F-score, a root mean square error (RMSE), a mean absolute error, and the like.

Figure 7:
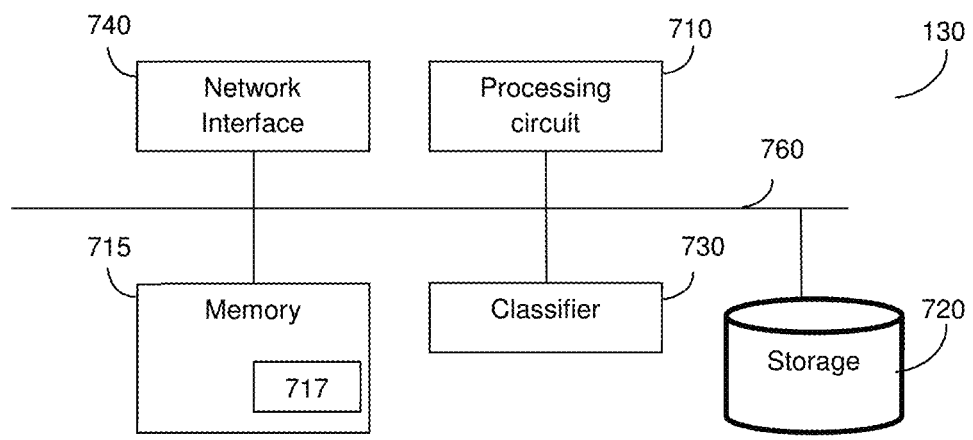
FIG. 7 is a block diagram of a classification server implemented according to an embodiment.

FIG. 7 shows an example block diagram of the classification server 130 implemented according to an embodiment. The classification server 130 includes a processing circuit 710 coupled to a memory 715, a storage 720, a classifier 730, and a network interface 740. In an embodiment, the components of the classification server 130 may be communicatively connected via a bus 760.

The processing circuit 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 715 may be volatile (e.g., RAM, etc.), non-volatile (e.g., ROM, flash memory, etc.), or a combination thereof. In one configuration, computer readable instructions to implement one or more embodiments disclosed herein may be stored in the storage 720.

In another embodiment, the memory 715 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuit 710 to perform the various processes described herein. Specifically, the instructions, when executed, configure the processing circuit 710 to classify received machine-generated textual data into statistical metrics. In a further embodiment, the memory 715 may further include a memory portion 717 including the instructions.

The storage 720 may be magnetic storage, optical storage, and the like, and may be realized, for example, as flash memory or other memory technology, CD-ROM, Digital Versatile Disks (DVDs), or any other medium which can be used to store the desired information. The storage 720 may store the received machine-generated textual data, events, metadata for events, events schema, various elements of each events, and/or the classification results.

The classifier 730 is configured to classify machine-generated textual data into metrics to enable systems to ingest, process, analyze, aggregate, and correlate by machines without scale or volume limitations. In an embodiment, processes performed by the classifier 730 as discussed in greater detail above, at least with respect to FIG. 6.

The network interface 740 allows the server 130 to communicate with the data sources 140 for the purpose of, for example, receiving machine-generated textual data. The server 130 can be utilized to output the classification results to external systems (not shown) for further processing. In an embodiment, the network interface 740 can allow interface with client devices to view the classification results and/or configured the server 130.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method implemented by a computer system, comprising:
   receiving, by the computer system, machine-generated textual data from at least one data source, wherein the received machine-generated textual data comprises unstructured data and structured data;
   grouping, by the computer system, the received machine-generated textual data into a plurality of events;
   processing, by the computer system, each event of the plurality of events to determine a plurality of messages associated with the events and a plurality of tokens embedded within each message of the plurality of messages;
   determining, by the computer system, a respective token type of each token of the plurality of tokens;
   clustering, by the computing system, the plurality of messages into a plurality of clusters based on a degree of similarity between respective tokens of the plurality of messages and the respective token types of the respective tokens;
   determining, by the computer system, respective statistical metric types for the plurality of clusters and the plurality of tokens;
   verifying, using a machine-learning process of the computer system, the respective statistical metric types for the plurality of clusters and the plurality of tokens using a trained data model;
   generating, by the computer system, one or more statistical metrics based on the respective statistical metric types determined for the plurality of clusters and the plurality of tokens; and
   transmitting, by the computer system, respective representations of the one or more statistical metrics to a display device for display.

2. The method of claim 1, wherein processing each event comprises:
   segmenting the event into at least a payload portion and a header portion.

3. The method of claim 2, comprising:
   processing the header portion to identify at least one property of the event; and
   processing the payload portion to identify the plurality of messages.

4. The method of claim 1, wherein clustering the plurality of messages into the plurality of clusters comprises:
   masking one or more tokens of the respective tokens of the plurality of messages;
   matching one or more messages of the plurality of messages to a respective message of one or more existing clusters; and
   associating the one or more messages to a matching cluster of the one or more existing clusters.

5. The method of claim 1, comprising:
   determining respective context of the plurality of messages, or the plurality of tokens, or both.

6. The method of claim 5, wherein the respective statistical metric types for the plurality of clusters and the plurality of tokens are determined based on the respective context of the plurality of messages, or the plurality of tokens, or both.

7. The method of claim 1, wherein the one or more statistical metrics comprise a gauge, a meter, or a histogram, or a combination thereof.

8. The method of claim 1, comprising:
calculating respective statistical attributes for the plurality of events based on the one or more statistical metrics.

9. The method of claim 1, wherein the at least one data source comprises an information technology (IT) system.

10. The method of claim 9, wherein the machine-generated textual data comprises one or more application logs, one or more configuration files, one or more alerts, one or more sensory signals, or one or more audit records, or a combination thereof.

11. A non-transitory computer readable medium having stored thereon instructions for causing one or more processing units to execute a process comprising the steps of:
receiving machine-generated textual data from at least one data source, wherein the received machine-generated textual data comprises unstructured data and structured data;
grouping the received machine-generated textual data into a plurality of events;
processing each event of the plurality of events to determine a plurality of messages associated with the events and a plurality of tokens within each message of the plurality of messages;
determining a respective token type of each token of the plurality of tokens;
clustering the plurality of messages into a plurality of clusters based on a degree of similarity between respective tokens of the plurality of messages and the respective token types of the respective tokens;
determining respective statistical metric types for the plurality of clusters and the plurality of tokens;
verifying, using a machine learning process, the respective statistical metric types for the plurality of clusters and the plurality of tokens using a trained data model;
generating one or more statistical metrics based on the respective statistical metric types determined for the plurality of clusters and the plurality of tokens; and
transmitting respective representations of the one or more statistical metrics to a display device for display.

12. A system, comprising:
a processing circuit;
a memory communicatively connected to the processing circuit, wherein the memory contains instructions that, when executed by the processing circuit, cause the processing circuit to:
receive machine-generated textual data from at least one data source, wherein the received machine-generated textual data comprises unstructured data and structured data;
group the received machine-generated textual data into a plurality of events;
process each event of the plurality of events to determine a plurality of messages associated with the events and a plurality of tokens embedded within each message of the plurality of messages;
determine a respective token type of each token of the plurality of tokens;
cluster the plurality of messages into a plurality of clusters based on a degree of similarity between respective tokens of the plurality of messages and the respective token types of the respective tokens;
determine respective statistical metric types for the plurality of clusters and the plurality of tokens;
verify, using a machine learning process, the respective statistical metric types for the plurality of clusters and the plurality of tokens using a trained data model;
generate one or more statistical metrics based on the respective statistical metric types determined for the plurality of clusters and the plurality of tokens; and
transmit respective representations of the one or more statistical metrics to a display device for display.

13. The system of claim 12, wherein processing each event comprises:
segmenting each event into at least a payload portion and a header portion.

14. The system of claim 13, wherein the instructions cause the processing circuit to:
process the header portion to identify at least one property of the event; and
process the payload portion to identify the plurality of messages.

15. The system of claim 12, wherein the instructions cause the processing circuit to:
mask one or more tokens of the respective tokens of the plurality of messages;
match one or more messages of the plurality of messages to a respective message of one or more existing clusters; and
associate the one or more messages to a matching cluster of the one or more existing clusters.

16. The system of claim 12, wherein the instructions cause the processing circuit to:
determine respective context of the plurality of messages, or the plurality of tokens, or both.

17. The system of claim 16, wherein the respective statistical metric types for the plurality of clusters and the plurality of tokens are determined based on the respective context of the plurality of messages, or the plurality of tokens, or both.

18. The system of claim 12, wherein the one or more statistical metrics comprise a gauge, a meter, or a histogram, or a combination thereof.

19. The system of claim 12, wherein the instructions cause the processing circuit to:
calculate respective statistical attributes for the plurality of events based on the one or more statistical metrics.

20. The system of claim 12, wherein the at least one data source comprises an information technology (IT) system.

21. The system of claim 20, wherein the machine-generated textual data comprises one or more application logs, one or more configuration files, one or more alerts, one or more sensory signals, or one or more audit records, or a combination thereof.

* * * * *